(12) United States Patent
Miñano et al.

(10) Patent No.: US 7,729,577 B2
(45) Date of Patent: Jun. 1, 2010

(54) WAVEGUIDE-OPTICAL KOHLER INTEGRATOR UTILIZING GEODESIC LENSES

(75) Inventors: Juan Carlos Miñano, Madrid (ES); Pablo Benitez, Madrid (ES); Dejan Grabovickic, Madrid (ES); José Blen, Madrid (ES); Maikel Hernandez, Madrid (ES); Rubén Mohedano, Madrid (ES); Oliver Dross, Madrid (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 338 days.

(21) Appl. No.: 11/810,001

(22) Filed: Jun. 4, 2007

(65) Prior Publication Data

US 2008/0002423 A1  Jan. 3, 2008

Related U.S. Application Data

(60) Provisional application No. 60/810,161, filed on Jun. 2, 2006, provisional application No. 60/810,636, filed on Jun. 5, 2006.

(51) Int. Cl.
*F21V 7/04* (2006.01)
*G02B 6/32* (2006.01)
*G02B 6/10* (2006.01)

(52) U.S. Cl. ..................... 385/33; 385/146; 385/901; 362/555

(58) Field of Classification Search .................. 385/33, 385/146, 901; 362/555
See application file for complete search history.

(56) References Cited

U.S. PATENT DOCUMENTS

| | | | |
|---|---|---|---|
| 3,917,384 A | 11/1975 | Harper et al. | 350/96 |
| 4,345,815 A | 8/1982 | Righini et al. | 350/96.18 |
| 4,610,502 A | 9/1986 | Nicia et al. | 350/96.12 |
| 4,611,883 A | 9/1986 | Myer | 350/96.12 |
| 4,712,856 A | 12/1987 | Nicia | 350/96.12 |
| 5,153,773 A | 10/1992 | Muraki et al. | 359/619 |
| 6,005,722 A | 12/1999 | Butterworth et al. | 359/712 |
| 6,343,862 B1 | 2/2002 | Sawai et al. | 353/1 |
| 6,733,165 B2 * | 5/2004 | Van Der Lei et al. | 362/551 |

FOREIGN PATENT DOCUMENTS

GB 2 096 869 10/1982
WO WO 2007143196 A2 * 12/2007

* cited by examiner

*Primary Examiner*—Daniel Petkovsek
(74) *Attorney, Agent, or Firm*—Drinker Biddle & Reath LLP

(57) ABSTRACT

A waveguide version of a Kohler integrator is disclosed, utilizing geodesic lenses with a surface that can be mapped to a gradient-index Luneburg lens or to a nonfull-aperture Luneburg lens in such a way that the light paths in the gradient index lenses map into the geodesics of the surface, with the outer region of the gradient index lenses mapped into a flat surface. Arrays of these can be applied to lines of LEDs, as in CHMSLs, to mix light in intensity and in illumination as well as to avoid the deleterious effects of binning and burnout, or in multicolor arrays, to ensure complete chromatic mixing.

9 Claims, 13 Drawing Sheets

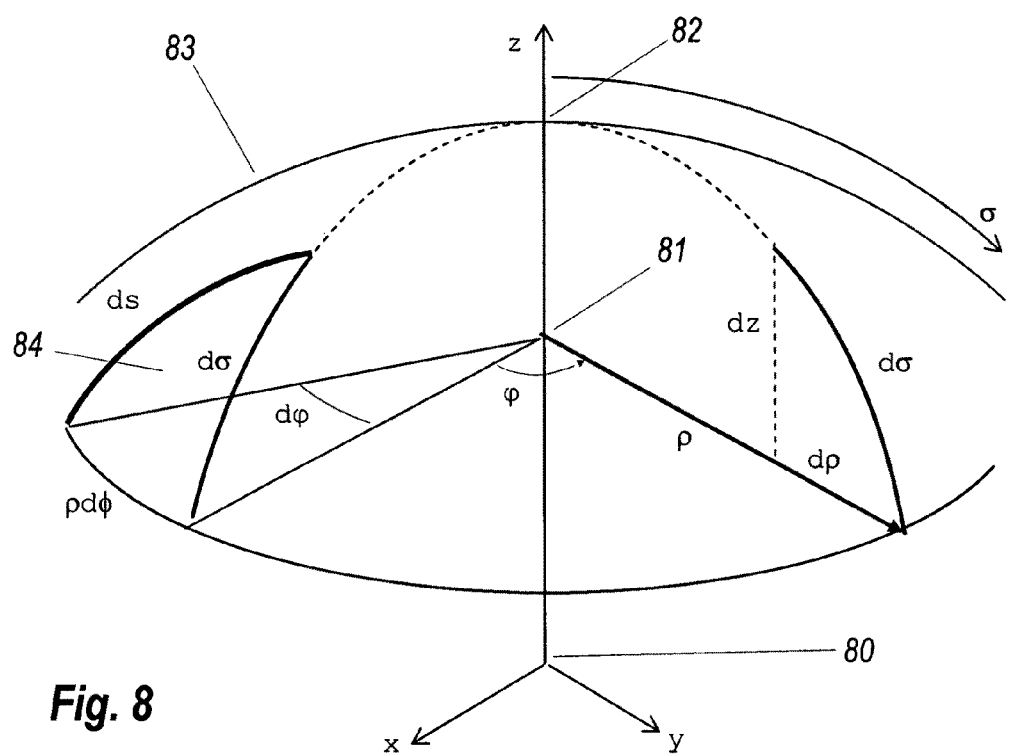
Fig. 8
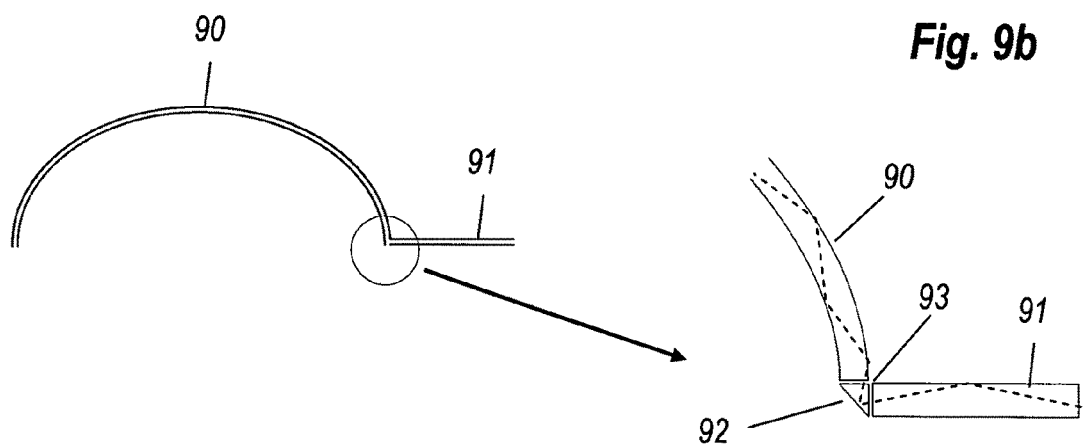
Fig. 9a
Fig. 9b

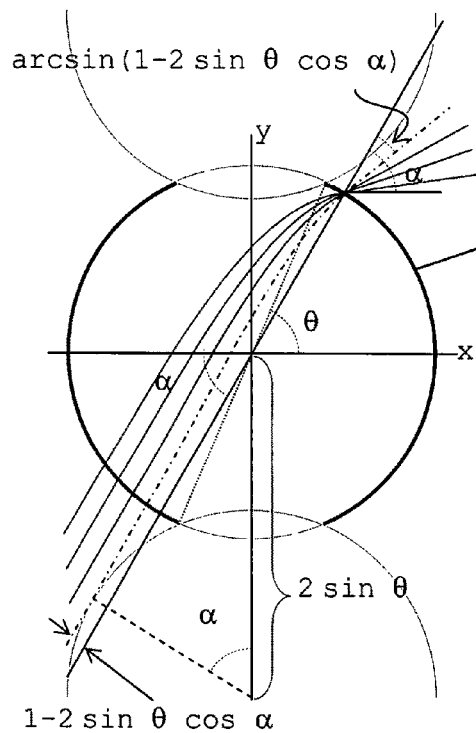
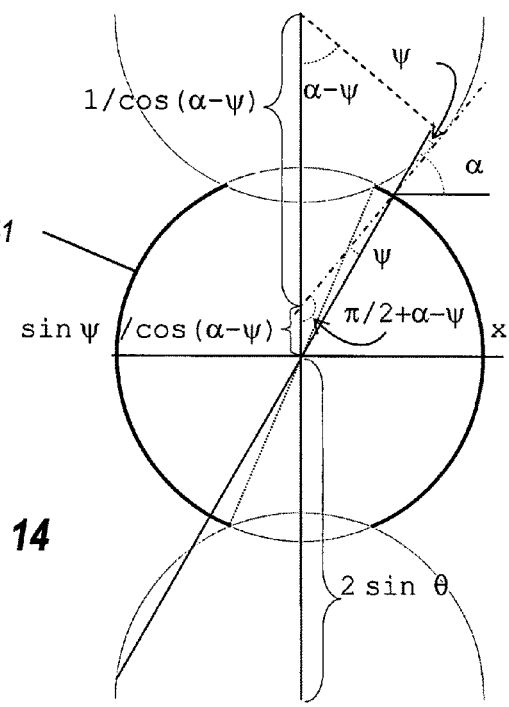
Fig. 14
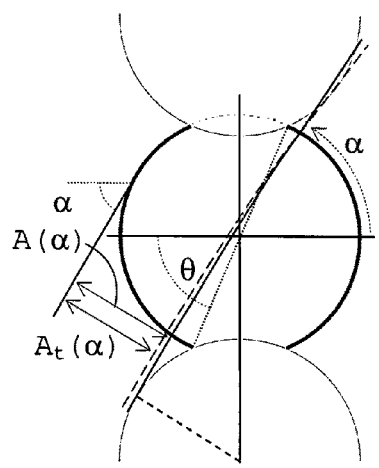
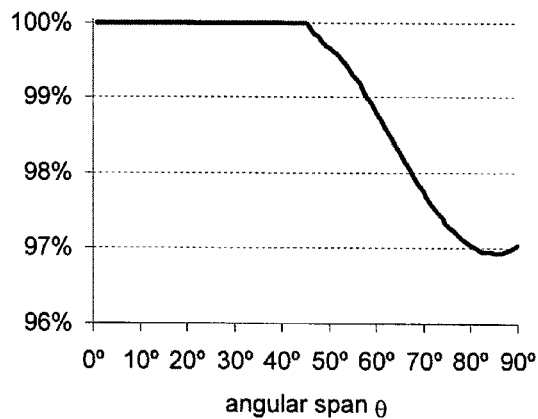
Fig. 15  Fig. 16

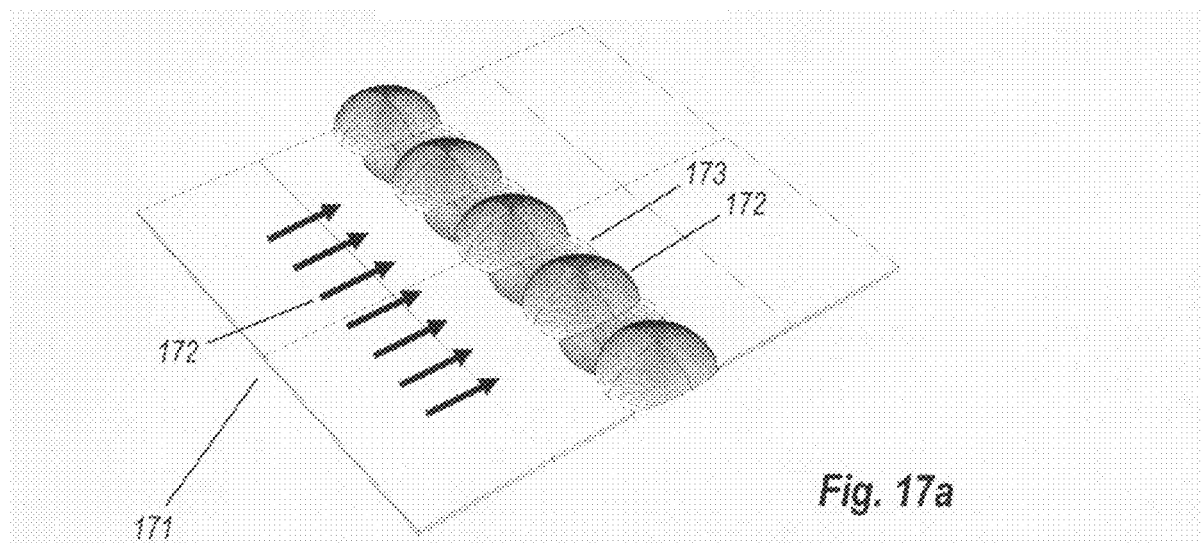
Fig. 17a
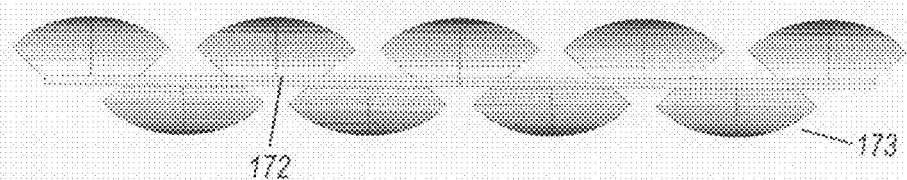
Fig. 17b
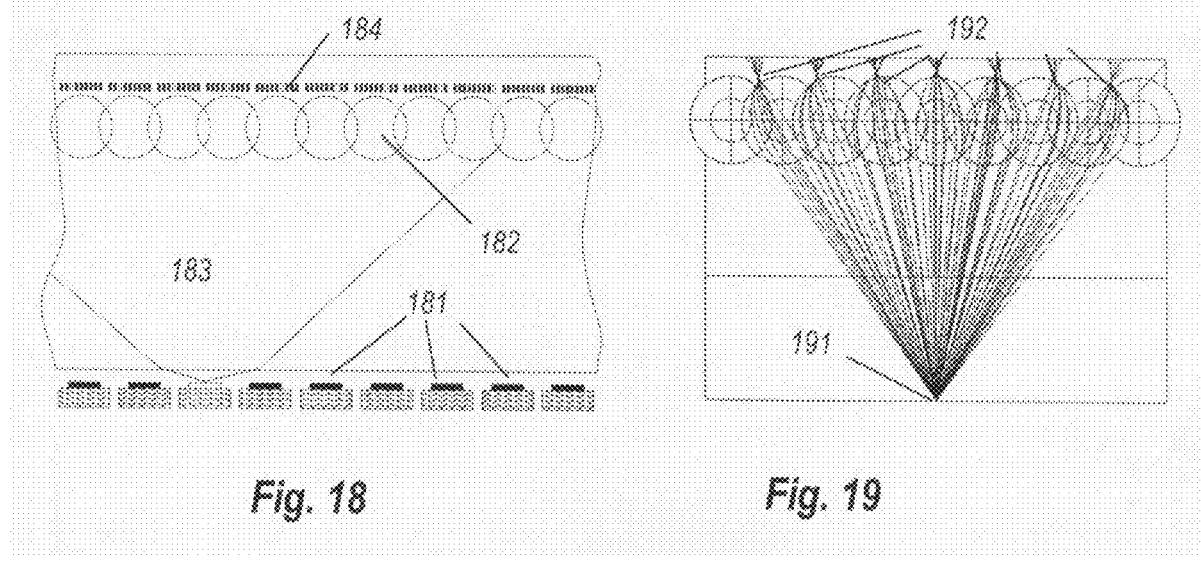
Fig. 18
Fig. 19

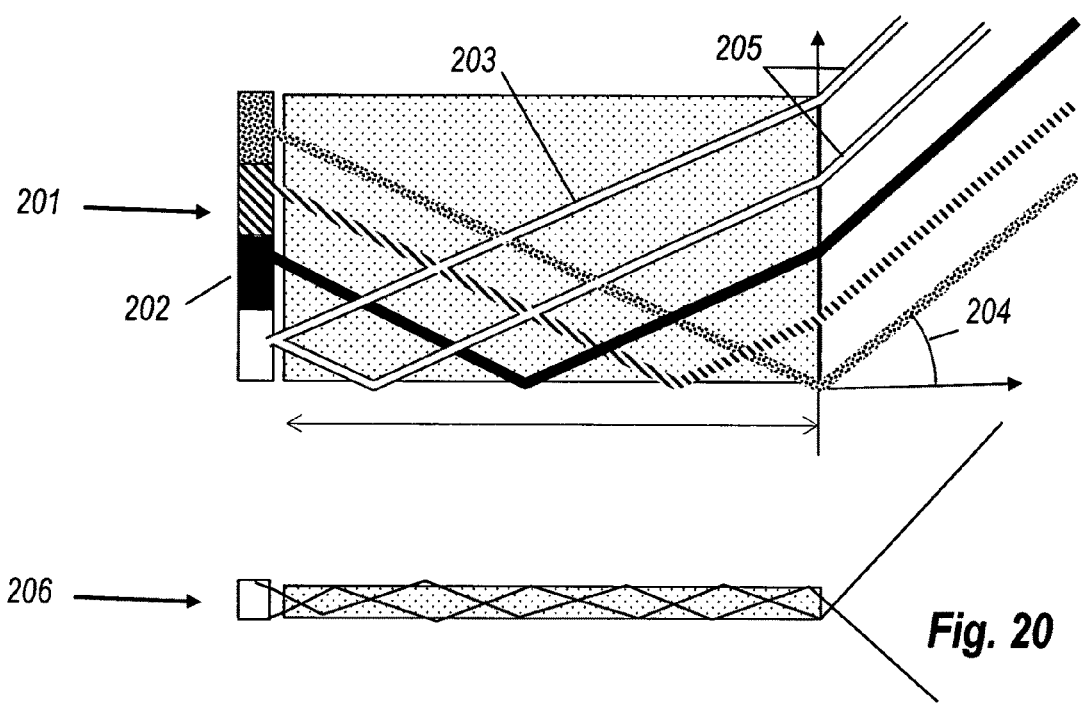
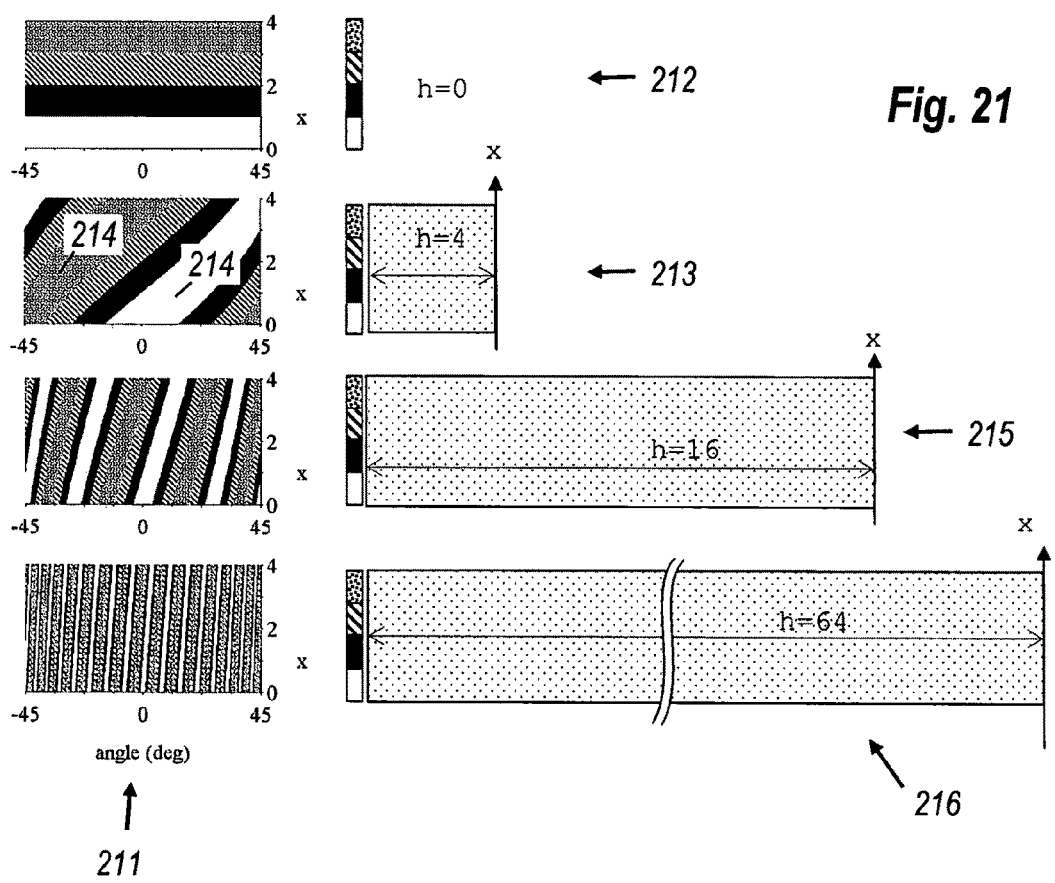
Fig. 20
Fig. 21

WAVEGUIDE-OPTICAL KOHLER INTEGRATOR UTILIZING GEODESIC LENSES

CROSS-REFERENCE TO RELATED APPLICATIONS

This application claims benefit of U.S. Provisional Patent Application No. 60/810,161, filed Jun. 2, 2006, which is incorporated herein by reference in its entirety, and of U.S. Provisional Patent Application No. 60/810,636, filed Jun. 5, 2006, which is incorporated herein by reference in its entirety.

BACKGROUND OF THE INVENTION

High-power light-emitting diodes are available both in white and a numerous narrow wavebands from royal blue (450 nm), through blue (470 nm), cyan (490 nm), green (520 nm), amber (580 nm), orange (600 nm), red (620 nm), to ruby red (650 nm). While RGB triplets are commercially available, either their separate chips are visible, and their multicolor light thus unmixed, or a diffuser surrounds them, leading to a single chromatic resultant, which after all is the triplet's original objective, but reducing luminance. The mixing of more than three colors can improve the color gamut of multicolor arrays as well as the color rendering of white-light illuminators.

More generally, lines of LEDs the same color, such as in the automotive center high-mounted stop lamp (CHMSL), suffer from differential lamp degradation, which in a few years leads to a ragged, irregular look at a distance. It would be preferable if the individual LEDs were not visible but instead had their light mixed to a single luminance, much as multiple colors must be mixed to a single chrominance. Both kinds of mixing are best done with very high efficiency, lest unacceptable losses be incurred.

Accordingly, embodiments of the present invention make it possible to solve, or at least mitigate, this vexing problem of efficient mixing, with a waveguide-optical approach, one that may also fall in the category of planar guided optics. This distinguishes it from such linear guided optics as illumination cable. A line of LEDs, for example, injects most of its light into the adjacent input face of a dielectric slab, one just wide enough for efficient injection of the array's light into guided illumination within it. The slab's length would be that of the LED array plus its own width. Alternatively, the guided light could be from a merging of smaller waveguides, such as with the commonly owned prior U.S. Patent Applications Nos. 2005/0243570 and 2006/0239006.

The present invention leads to full mixing in both space and angle, with high throughput, of guided light from a multiplicity of small light sources such as LEDs. Of course, invisible light could similarly be mixed to provide illumination for digital cameras.

SUMMARY OF THE INVENTION

The present invention relates generally to waveguide-based illumination, and more particularly to effective light-mixing therein. Mere propagation within a slab, however prolonged, will lead to spatial but not angular homogenization. The present invention uses Kohler integration to effectively mix in both space and angle, with far less device height, relative to inter-chip spacing.

Kohler integration (also known as Kohler-type illumination) is based on the use of two lenticular optical surfaces arranged such that each lenslet of the first array images the source onto the lenslets of the second array, which images the entry surface onto the target to be illuminated. Since the source-image is not projected onto the target, any source misplacement or luminance inhomogeneities do not affect the target illumination. Similarly, the output chromaticity is fully mixed, showing the same color from all angles, everywhere on the aperture (as long as the lenslets are relatively small).

The present invention discloses the use of Kohler-integrating geodesic lenses in new waveguide-optical configurations suitable for light-mixing in multi-source illumination optics. Basically these lenses comprise protuberances formed by precisely shaped dimpling of the entire waveguide. Belonging in particular to the sub-category of Rinehart lenses, they deflect the planar light trajectories in the same mathematical manner as focusing by the gradient-index optical device known as the Luneburg lens. Within the waveguide this focusing leads to the desired angular mixing because these geodesic lenses have the novel attribute of being able to act as a Kohler illuminator, a well-known configuration in two-dimensional lenticular optics that can integrate in angle as well as space.

The injection of light from adjacent LEDs leads to light going laterally across the waveguide as it propagates into it, but confined to within the critical angle $\theta c = \sin^{-1}(1/n)$. If N adjacent LEDs are spaced laterally across the waveguide entrance along length L, then to receive their light for integration the geodesic lenses must be at a depth of at least L tan $\theta c$.

The present invention embodies the application of the principle of the Kohler illuminator to waveguide-based illumination optics, via geodesic lenses, which are equivalent to the canonical Luneburg lens of gradient-index optics.

The present invention also embodies the application of geodesic lenses on waveguide-based illumination optics to collimate or concentrate light.

BRIEF DESCRIPTION OF THE DRAWINGS

The above and other aspects, features, and advantages of the present invention will be more apparent from the following more particular description thereof, presented in conjunction with the following drawings wherein:

FIG. 8 shows the differential vectors for lens derivation.

FIG. 9a shows a cross section of the ideal Rinehart lens.

FIG. 9b is a close up view of the margin of same.

FIG. 14 shows details for the calculation of blocking and shading by adjacent lenses in an array.

FIG. 15 shows transmission by adjacent lenses.

FIG. 16 is a graph of the transmission of an array.

FIG. 17a is a perspective view of a dual array of Rinehart lenses on the same waveguide.

FIG. 17b is a side view of same.

FIG. 18 shows an array of geodesic lenses integrating a line of LEDs.

FIG. 19 is a ray trace of same.

FIG. 20 shows a kaleidoscope and a line of different colored LEDs.

FIG. 21 shows the effect of mixing length.

Corresponding reference characters indicate corresponding components throughout the several views of the drawings.

DETAILED DESCRIPTION OF THE PREFERRED EMBODIMENTS

Figure 1:
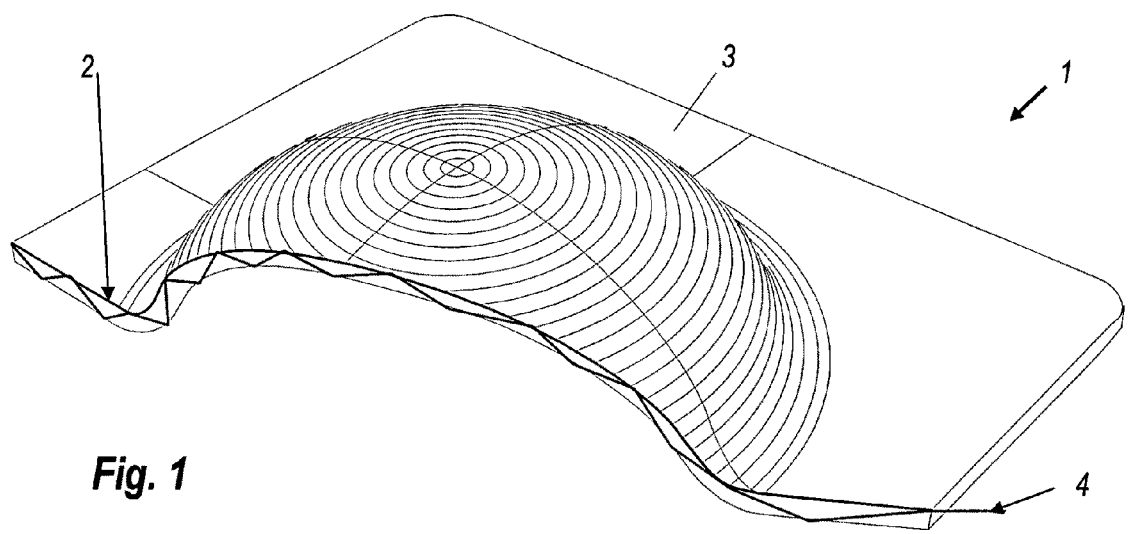
FIG. 1 is a perspective view showing a geodesic lens.

FIG. 1 is a schematic cutaway view of waveguide system 1, comprising planar waveguide 2 interrupted by geodesic lens 3, which has the configuration of a waveguide-protuberance with a constant thickness which is equal to that of waveguide 2. Guided example ray 4 bounces within the waveguide, making its way over the geodesic lens, its initial direction altered. This directional alteration gives rise to the lensing function, and its place in the present invention. A geodesic lens is in general any such dimple in a waveguide, its shape causing the direction of light to be altered when passing through the dimpled passage. The projection of the rays on the surface of the dimple follows curved paths quite similar to those of gradient-index optics. A particular example of a geodesic lens is the Rinehart lens, modifications of which are utilized in the present invention.

Figure 2:
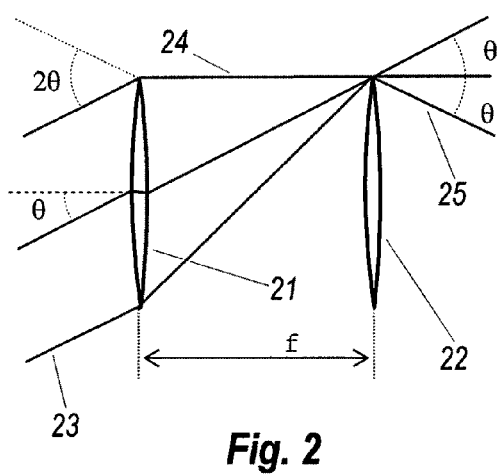
FIG. 2 shows a pair of identical lenses acting as a Kohler integrator.

The motivation for this comes from the desirability in illumination optics of Kohler integration, an optical function normally done in free space by pair of lenses or by a pair of lens arrays. FIG. 2 shows two identical lenses 21 and 22, spaced a distance apart equal to their focal length f, a configuration called a Kohler illuminator or Kohler integrator. Parallel rays 23 are incoming at angle θ, across the aperture of lens 21, which transforms them into converging ray-pencil 24, focused at the edge of lens 22, which transforms it into diverging rays 25, confined to the same angle θ. Outgoing rays 25 issue from the same place on lens 22. Any variations in the strength of rays 23 will contribute to variations of illuminance across lens 21. This same variation in strength of rays 25 contributes instead to variations of intensity from their point of divergence.

In actual illumination, the totality of incoming parallel rays, at angles ranging from on-axis to a limiting angle θ, will sum up to the total illumination pattern upon lens 21. But all rays at a particular angle will be focused a particular lateral distance from the center of lens 22. Now the definition of intensity is merely the sum total of the strength of the parallel rays incoming at one angle. The varying lateral focal points sum up to an illumination distribution that is directly proportional to the incoming intensity distribution. Similarly, the incoming illumination pattern is transformed into an outgoing intensity pattern. Advantageously, every spot on lens 22 will have the same intensity pattern, so that the overall pattern of the lens will not change if part of it is blocked. This robustness is not found in most illuminators, which have substantial intensity-pattern variations across their exit apertures.

In the interest of compactness and reduction of manufacturing costs of a Kohler integrator, lenticular optics can be employed, whereby an array of small lenses substitutes for one large one. Besides being less costly to manufacture than a single large lens, the two arrays need only be spaced apart by the relatively small focal length of the elemental lenslets of the arrays.

Figure 3:
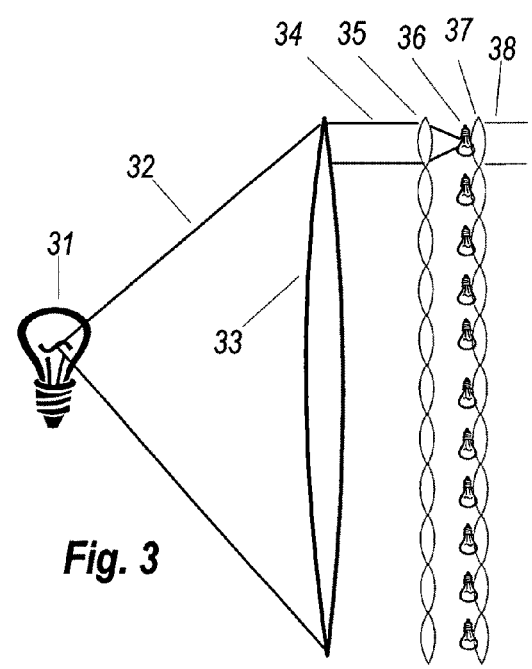
FIG. 3 shows a pair of lenticular arrays acting as a Kohler integrator of a collimated beam.

FIG. 3 shows light source 31 sending diverging beam 32 to collimating lens 33, which outputs a beam of nearly parallel rays, exemplified by rays 34. Lenticular array 35 focuses this collimated light at multiple images 36. Second lenticular array 37 is placed on these images, resulting in collimated output beam 38. If lens 33 produces uniform illumination onto array 35, then the output rays 38 will have uniform intensity with a sharp cutoff. As with the lens pair of FIG. 2, the two lenticular arrays act as a Kohler integrator, transforming input illuminance into output intensity and vice versa. This transformation is equivalent to a 90° rotation about the center of a two-dimensional phase space comprising lateral coordinate y and q, the cosine of a ray's deviation from the y-axis, which is the vertical axis in FIG. 2 and FIG. 3. In two dimensions, q can also be defined as the sine of a ray's angular deviation from the x-axis.

Figure 4:
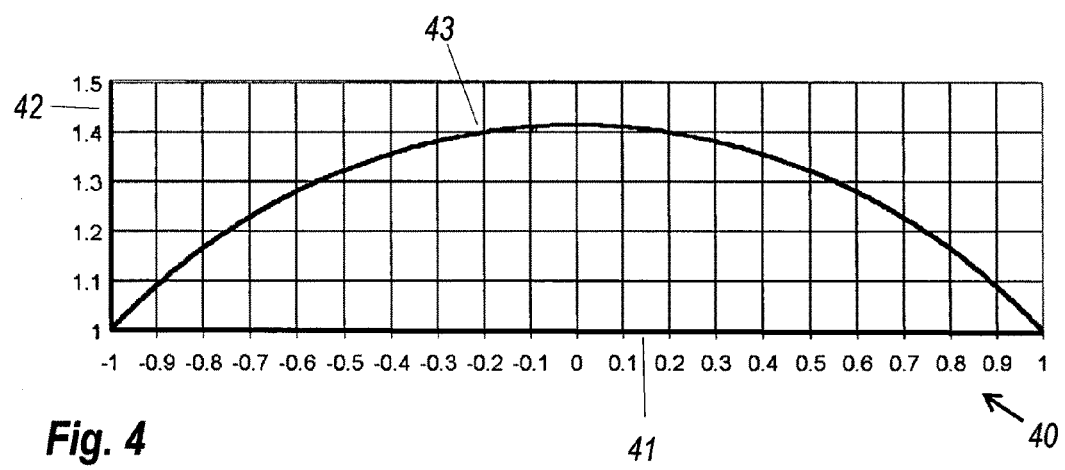
FIG. 4 shows how refractive index varies radially within an ideal Luneburg lens.

The lenslet shapes used in actual reticular arrays have drawbacks, in that their inescapable aberrations prevent the use of very short focal lengths. Also, the requisite spacing between the two arrays requires mechanical spacers to maintain its accuracy. Thus a single-piece device for the same integration function would be highly advantageous. Theoretically, an idealized gradient-index lens can do this, although physically it has only been implemented for microwaves. Known as the Luneburg lens (R. K. Luneburg, *Mathematical Theory of Optics*, University of California Press, Los Angeles 1964), it is a sphere with a radially symmetric refractive-index function $n[r]=\sqrt{(2-r^2)}$. This sphere has unit radius and its operation requires that it be immersed in air (n=1). At the center of the sphere its index is $\sqrt{2}=1.414$, and at the edge it is n=1. FIG. 4 shows graph 40, with horizontal scale 41 running from −1 to +1, representing distance along a sphere diameter. Vertical scale 42 measures local refractive index n[r], which is displayed by arc 43.

While an aerogel implementation is conceivable, there is no known method of producing a continuous density change in aerogel, let alone this particular one. Nonetheless, the Luneburg lens is theoretically important, because its phase-space action is identical to that of an ideal (aberration-less) pair of lenslets in FIG. 2. In order to see this, the following two Figures show the operation of the Luneburg lens.

Figure 5:
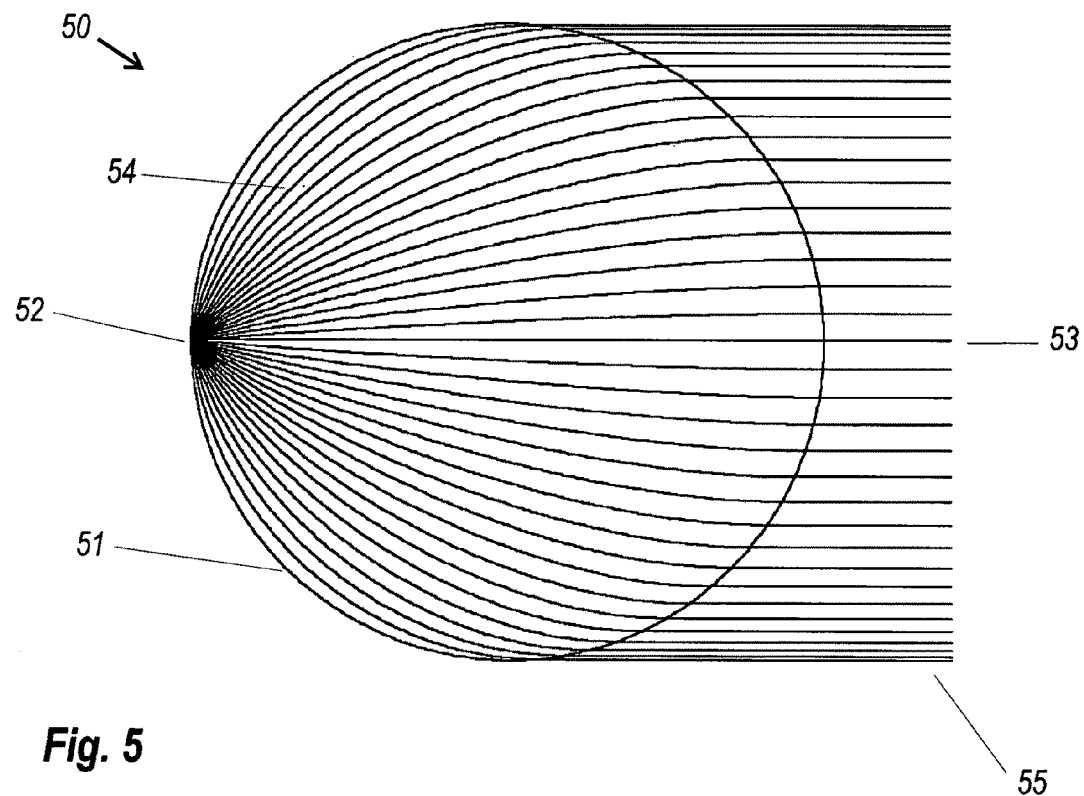
FIG. 5 shows the focusing action of a Luneburg lens upon rays from its edge.

FIG. 5 shows the optical action of Luneburg lens 50, the edge of which is outlined by unit-radius circle 51. Point source 52 is on circle 51, and rays are shown radiating inward therefrom at equally spaced angles. Central ray 53 passes undeflected through the center of lens 50, defining an axis of symmetry. As true for any ray entering a Luneburg lens, elliptical arcs 54 are each a segment of one a set of mutually concentric ellipses, of differing orientations and elongations but all concentric with lens 50. Disposed symmetrically about central ray 53 and parallel thereto are collimated rays 55, spanning the diameter of circle 51. If they vary in strength then they contribute non-uniformly to output illuminance, whereas at input point 52 they represent non-uniform input intensity.

Every point on the outer surface of a Luneburg lens, through which light passes at all incidence angles up to 90°, gives rise to a collimated output beam out the opposite side of the lens. As with the Kohler integrator of FIG. 2, the Luneburg lens transforms illuminance into intensity and vice versa, meaning that it is also a Kohler integrator. Unlike the lenslets of FIG. 3, however, Luneburg lenses have an overlap problem, as shown in the next Figure.

Figure 6:
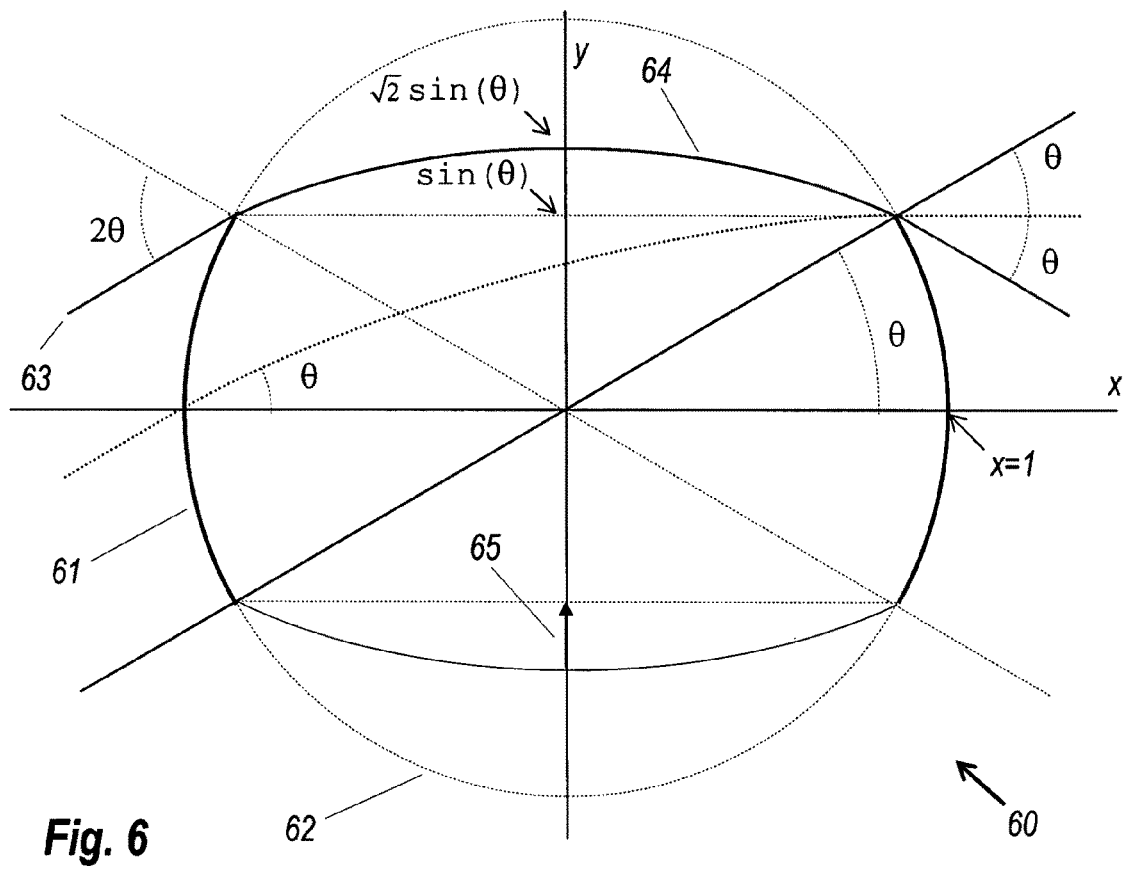
FIG. 6 shows the overlap problem of a Luneburg lens.

FIG. 6 shows Luneburg lens 60 with unit length radius operating within limiting angle θ, so that to accommodate being in an array it must be laterally truncated to semi-width sin θ. Lens 60 is bordered by a circle comprising solid arcs 61 and dotted arcs 62. Solid arcs 61 span the truncated portion of Luneburg lens 60 and form the input and output faces (or vice versa). Dotted arcs 62 denote optically inactive surface that is be to be removed to make room for the adjacent lens in an array. The problem can be seen with incoming limiting ray 63 taking interior elliptical path 64, which has maximum lateral traverse of √2 sin θ. The excess is shown by arrow 65, which basically forbids the arrays of Luneburg lenses for θ smaller than 90 degrees. For θ=90 degrees this problem does not exist.

Figure 7:
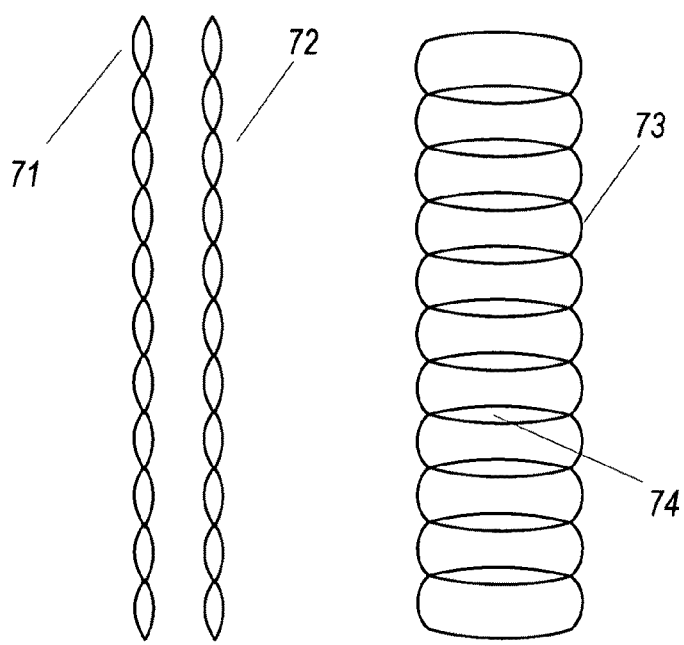
FIG. 7 also shows this problem.

FIG. 7 reinforces this constraint, showing on the left lens arrays 71 and 72 acting as a Kohler integrator, and on the right the equivalent Luneburg lenses in array 73, with their mutually interfering overlaps 74 also shown.

The present invention discloses an escape from this restriction. As discussed regarding FIG. 1, waveguide optics offers a device that causes light to follow planar paths that when seen from above are similar to those seen in FIG. 5. The elliptical arcs are caused by in-path variations of the refractive index distribution n[r], via Fermat's principle of minimum path, another name for which is a geodesic. In waveguide optics, the planar waveguide is many times thinner than its width or length, so that on the local scale the indentation such as in FIG. 1 is locally nearly flat. This is to minimize the leakage from relative surface curvature of the waveguide when it departs from a planar shape, and in effect to assure that guided waves, as they bounce between top to bottom waveguide surfaces via total internal reflection, follow the local geodesics of the surface. A surface with geodesics that can be mapped to the ellipses of the Luneburg lens is called a Rinehart surface, and its planar-optical implementation called the Rinehart lens, a special type of geodesic lens. The mapping between the Rinehart surface and the points of the Luneburg lens is such that the region outside the circle of unit radius, which is the region of n=1 in the Luneburg lens, is mapped into a flat surface. The following Figure shows how the Rinehart surface profile is derived.

FIG. 8 shows Cartesian coordinate system 80 with mutually perpendicular x, y, & z axes, as well as cylindrical coordinate system 81 with radial coordinate ρ and azimuthal coordinate φ jointly equivalent to x and y. A radially symmetric surface profile is valid for all azimuths and begins at central point 82 on axis z, the highest point on the Rinehart surface. Exemplary arc 83 proceeds radially outward therefrom, with monotonically increasing path length σ, and its particular shape specified by the function ρ(σ). Thus any point on the Rinehart surface can be specified by the coordinates σ and φ. Locally, the surface profile is described by the path-length differential dσ and its associated differentials dz and dρ, which are related by $d\sigma^2=dz^2+d\rho^2$. On that surface, elemental right triangle 84 yields $ds^2=d\sigma^2+(\rho d\phi)^2$ for any length differential ds on the surface. As the waveguide geodesic equivalent to the Luneburg lens, there is a mapping between the Rinehart lens and the Luneburg lens such that its surface geodesics are mapped into the elliptical-arc light-paths, shown in FIG. 5, within the Luneburg lens. If r is the radial coordinate in the Luneburg lens, this mapping is such that the azimuthal coordinate φ is the same and $\rho=rn[r]=r\sqrt{(2-r^2)}$.

For an elliptical-arc ray-trajectory on the x-y plane within a Luneburg-lens (where $x^2+y^2=r^2$), the differential-geometry requirement for the equivalence is $d\sigma=n[r]dr$. Along with the requirement $\rho(\sigma)=rn[r]=r\sqrt{(2-r^2)}$, this generates an explicit form of Rinehart surface, as $$z(\rho) = \sqrt{2} - \sqrt{1 - \frac{3\rho^2}{4} + \sqrt{1-\rho^2}} + \frac{1}{\sqrt{3}}\ln\left(\frac{\sqrt{\frac{3}{2}[1+\sqrt{1-\rho^2}]} + \sqrt{\frac{1}{2}[1+3\sqrt{1-\rho^2}]}}{\sqrt{3}+\sqrt{2}}\right) \quad 0 \leq \rho \leq 1$$

FIG. 9a shows Rinehart lens profile 90 and adjacent planar waveguide 91. FIG. 9b is a close up of where they join, showing toroidal right-angled prism 92 with small air gaps 93. This prism couples the flat waveguide to the perpendicular edge of the lens. Air gaps are only desirable if the light impinges the air gap close to normal incidence and the angular spread is not very large. In general the air gaps increase the complexity and are not desirable.

Figure 10A:
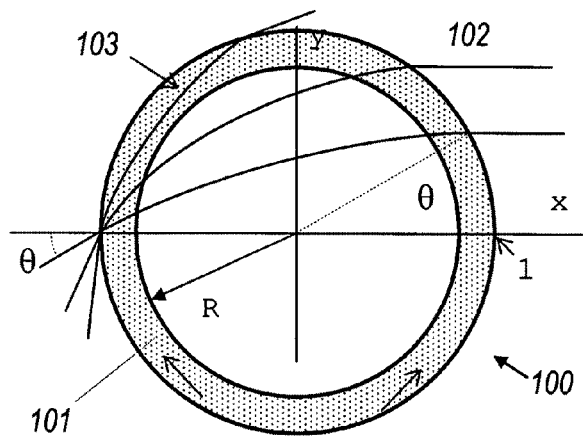
FIG. 10a shows how to compromise at the edge of the Luneburg lens.

FIG. 10a shows Luneburg lens 100 with modified refractive index in peripheral zone 101. Such lenses are called Nonfull-aperture Luneburg lenses. The refractive index distribution in the peripheral zone can be prescribed and the refractive index in the remaining inner region is calculated to obtain the same output-ray deflection as in a Luneburg lens. Rays 102 exit the lens at the same position and angle as would correspond in a full Luneburg lens (although the path is not exactly the same) but ray 103 entering said zone represents light not properly refracted and thus lost. This ray only crosses the prescribed region, which can be chosen to obtain a geodesic equivalent surface with smooth transitions between the flat and the bumped regions. This smoothed Rinehart lens is defined as the geodesic lens with continuous derivative derived from a Nonfull aperture Luneburg lens.

Figure 10B:
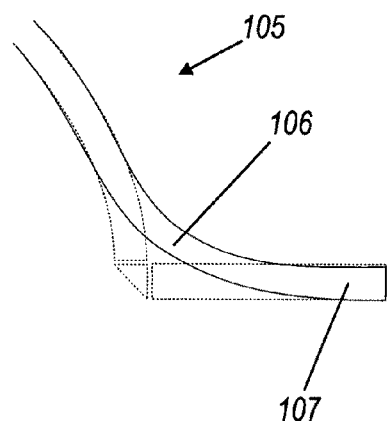
FIG. 10b shows the corresponding compromise at the edge of the Rinehart lens.

FIG. 10b shows the edge of the profile of smoothed Rinehart lens 105, with bell-shaped transition section 106 sloping for a smooth join with planar waveguide 107.

Figure 11:
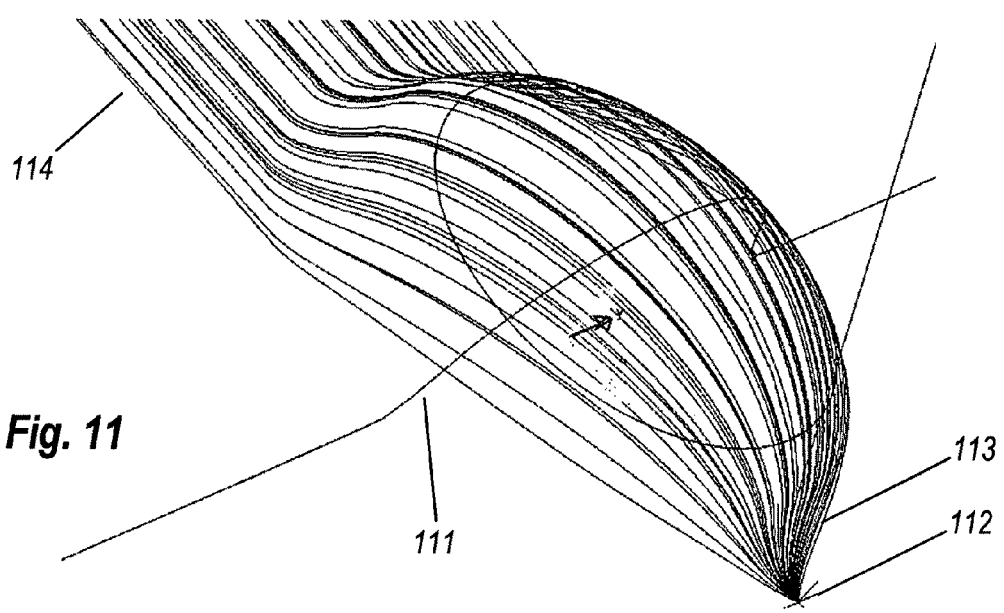
FIG. 11 shows the compromise design in collimation.

FIG. 11 shows the collimating action of the Rinehart lens, shown only by its profile 111. Point source 112 issues diverging rays 113, which become parallel rays 114.

Figure 12A:
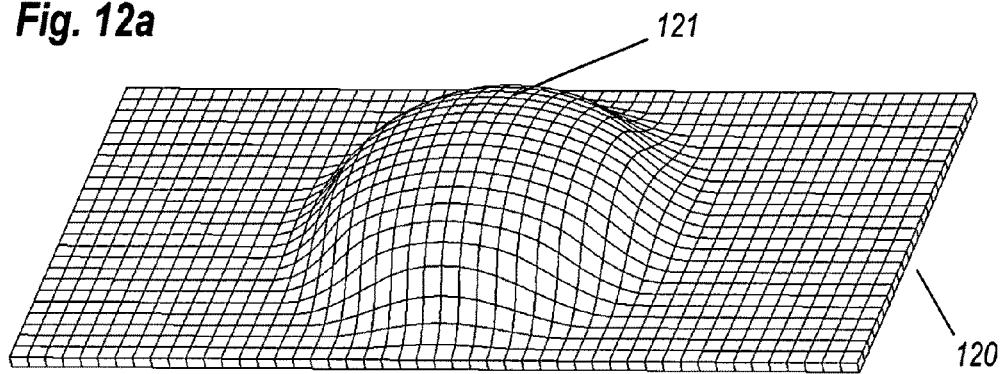
FIG. 12a is an upper perspective view of the waveguide lens.
Figure 12B:
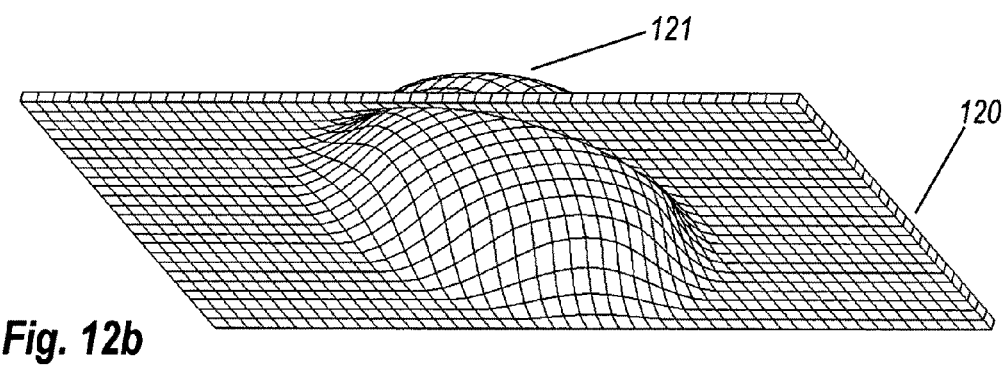
FIG. 12b is a lower perspective view of same.

FIG. 12a is a perspective view from above of planar waveguide 120 and Rinehart lens 121. FIG. 12b is the same seen from below.

Figure 13:
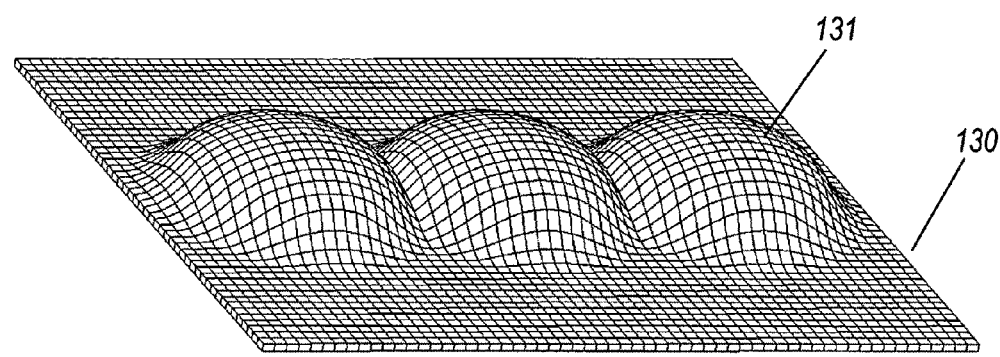
FIG. 13 shows three lenses in an array.

FIG. 13 is a perspective view from above of planar waveguide 130 with three Rinehart lenses 131, arrayed such as to minimize their overlap losses.

FIG. 14 shows blocking of the output light by a neighboring lens. Another source of losses is the blocking produced by adjacent lenses, once the radiation has exited the lens. The array shown in FIG. 14 is characterized by the angle θ of the accepted span of incoming light. The Rinehart lens is cut so that its entry and exit apertures measures 2 sin θ (radius of the lens is assumed to be 1). Light is coming in from the left side and exits through the right side. Consider that the incoming radiation is a parallel beam forming an angle α with the x axis. The angle θ is defined at the point of intersection with the adjacent lens. Because the point through which the light exits the lens is (x=cos α, y=sin α), cases with α>θ need not be considered.

There is no blocking when θ<π/4. When θ=π/4, one edge-ray exiting the corner between adjacent lenses is tangent to the next lens. When θ>π/4, the adjacent lens blocks some exiting rays, but fortunately this shadow (angle ψ in FIG. 14 right) fits quite well (although not perfectly) with the shadow produced at the entry by the other adjacent lens (angle arc sin(1−2 sin θ cos α) in FIG. 14 left). This shadow at the entrance is not a loss; as the radiation is merely intercepting the adjacent lens instead. FIG. 14 shows the angular relations needed to calculate the blocking losses by the adjacent lens.

Transmission factor T(α) is defined as the ratio of $A_t(α)/A$ (α) (shown in FIG. 15), i.e., the ratio of array aperture that is not shadowed by itself when the array is illuminated by rays tilted an angle α. A global transmission $T_G$ is also defined as the ratio of power exiting the array over the power intercepted by the array, comprised of rays of constant (non null) radiance over the angular span ±θ. Assuming no other losses, the global transmission is $$T_G = \frac{\int_0^\theta A_t(\alpha) d\alpha}{\int_0^\theta A(\alpha) d\alpha}$$

The transmission factor T(α) is 100% for α<θ, when θ<45°, i.e., arrays with θ<45° are theoretically ideal Kohler illuminators. When θ>45°, the global transmission slightly declines, to 97% (corresponding to θ=90°), as graphed in FIG. 16. This 3% theoretical loss is spectacularly small, particularly for an angular span as large as ±90°

FIG. 17a is a perspective view of planar waveguide 171 with propagating light 172. Alternating Rinehart lenses 173 are shown protruding upward, while interleaving lenses 174 are protruding downward. This avoids the overlap problem, admittedly at a cost of manufacturing complexity. FIG. 17b is a side view showing the alternating orientation of adjacent Rinehart lenses.

FIG. 18 shows a center-mounted middle stop light (CHMSL) with LEDs 181 shining onto an array of geodesic lenses 182, located after a portion of planar waveguide 183. The geodesic lenses 182 produce multiple interleaved images of the LEDs 184. Thus when a particular LED dims or burns out, it will not affect the outer appearance of the CHMSL.

FIG. 19 is a ray trace of a CHMSL, showing an LED source 191 and its multiple images 192.

FIG. 20 depicts a kaleidoscopic mixer with four differently color LEDs, showing how the incomplete mixing. The top view 201 of this kaleidoscope shows 4 LEDs 202 of different color and the trajectory 203 of some rays leaving the kaleidoscope at the same angle 204. The intensity mixing produced by the kaleidoscope is sometimes not good enough because the contribution of each LED to the intensity at a given direction 204 is not even, as shown by the rays 205 leaving from the LED located at the bottom edge. The lateral view is shown in 206.

FIG. 21 shows the effect of kaleidoscope length upon mixing. The phase-space diagrams 211 on the left show the degree of mixing. Each point of the phase-space diagram represents a ray. The horizontal axis of these diagrams is the angle of the ray 204 when the ray leaves the kaleidoscope. The vertical axis of these phase space diagrams is the x coordinate of the rays when the ray leaves the kaleidoscope. The pattern of each region of the phase space diagram shows the LED where the rays represented by this region come from. This phase-space representation shows easily the degree of mixing of the light at the kaleidoscope output. A good illumination mixing means that any horizontal line contains similar portions of regions belonging to the different LEDs. A good intensity pattern means that any vertical line must contain similar portions of segments of the different LED types. For instance, when the length of the kaleidoscope is zero, 212, then the regions of the different LEDs are horizontal since the color of the rays is only dependent on the position and not on the angle of the ray. The illumination mixing is very bad in this case while the intensity pattern is perfect. When the kaleidoscope length is not zero 213, the regions of the different LEDs in the phase-space diagram are no more horizontal, improving the illumination mixing. Nevertheless the intensity mixing is degraded because the regions 214 corresponding to the LEDs located at the edges of the kaleidoscope are thicker than the others. When the length becomes larger 215 and 216, the illumination mixing becomes better and better but the intensity mixing does not improve.

Figure 22:
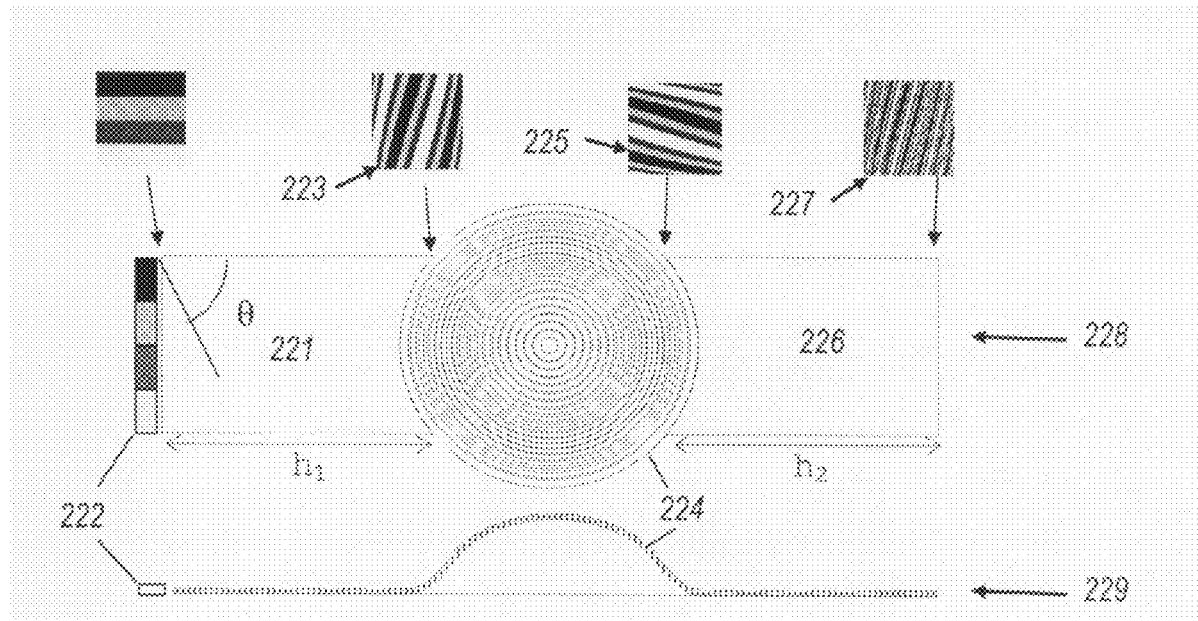
FIG. 22 shows a geodesic lens with a kaleidoscope.

FIG. 22 shows how a smoothed Rinehart lens completes the mixing of a kaleidoscope in which it is installed. The first kaleidoscope portion 221 gets a good illumination mixing of the light coming from 4 different color LEDs 222. The intensity mixing at the output of this kaleidoscope is poor. This is seen in the phase space diagram 223 at the output of this kaleidoscope portion. The geodesic lens 224 rotates the phase space diagram 90 deg as it is seen in the diagram 225 at the lens output, thus leaving a good mixing in the intensity pattern although the illumination pattern can be poor. A new kaleidoscope portion 226, gets both good illumination and intensity mixing as seen in the corresponding phase space diagram 227. FIG. 22 shows the top 228 and the side 229 view.

Figure 23:
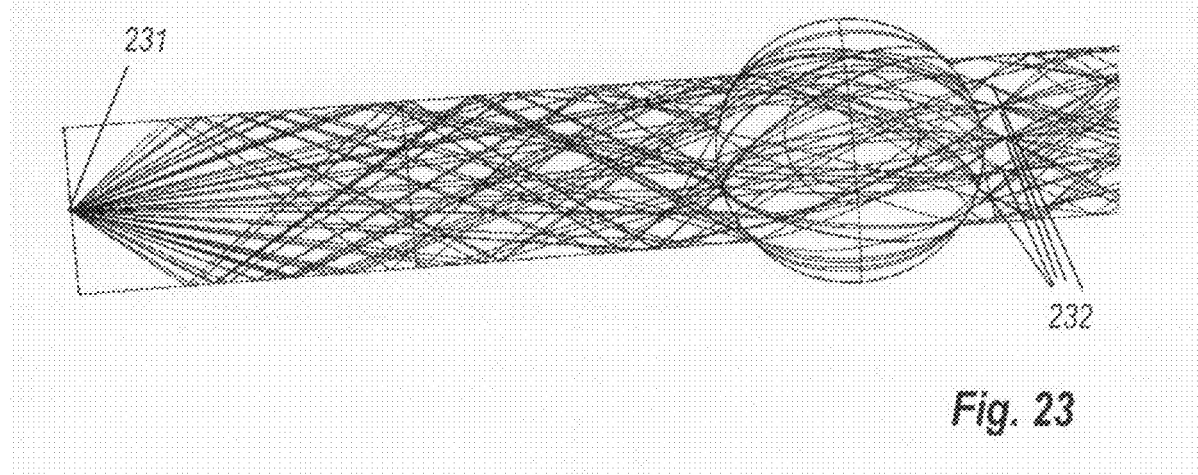
FIG. 23 is a ray trace of same.

FIG. 23 is a ray trace of one of the LEDs on the left 231 and its multiple images on the right 232. This is another way to see how the illumination pattern is uniformized by the geodesic lens: These multiple images 232 have a more uniform illumination pattern than the single source 231.

Figure 24:
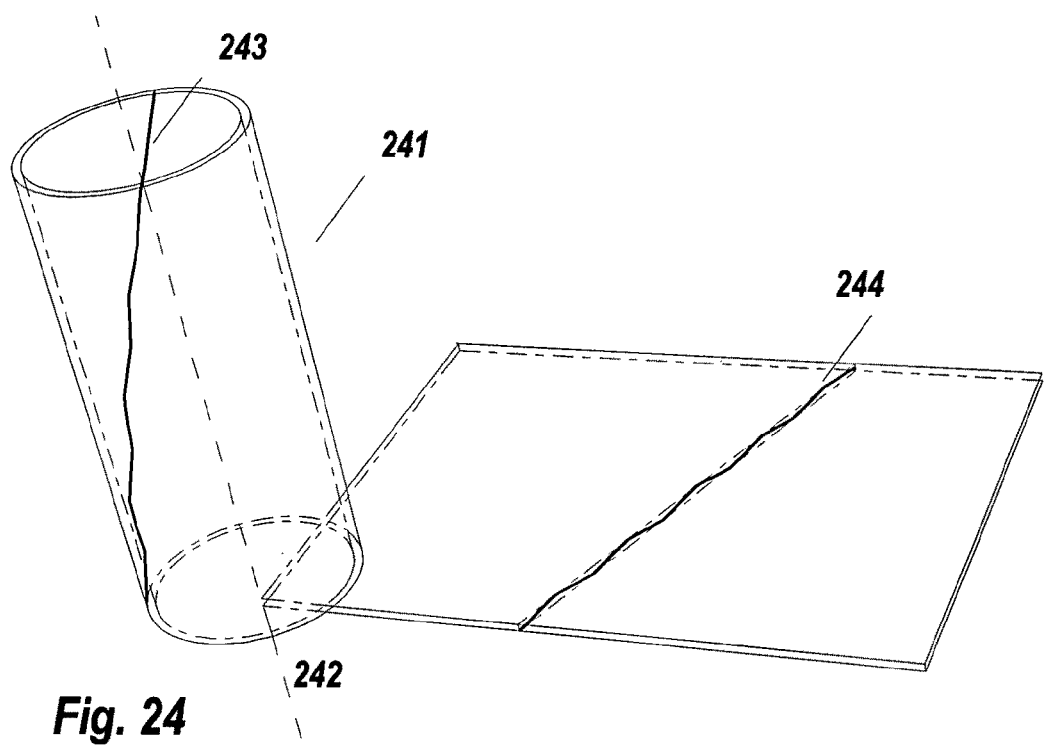
FIG. 24 shows a cylindrical geodesic waveguide and a development of the cylinder onto a plane.

FIG. 24 is a schematic view of a waveguide system 241 that has the form of a cylinder. The guiding of light occurs between two concentric cylinders with cylinder axis 242. The material inside the waveguide is a transparent dielectric. The projection on any cylinder of the trajectory of a ray 243 is a geodesic curve on the cylinder when the thickness of the waveguide is negligible compared with the radius of the cylinder. The cylinder is a developable surface, i.e., by developing its surface in a plane, the points of the cylinder can be mapped with those of the plane in such a way that its geodesic curves are mapped in straight lines in the plane. That makes the analysis of the geodesics in the cylinder very easy. The figure also shows a planar waveguide with a ray 244 whose projection on the plane corresponds to that of 243. Light can be injected by one edge of the cylinder and travel guided by the geodesic lens in a similar way as it does when traveling inside a planar kaleidoscope. One of the advantages of the cylindrical guide is that unlike the planar kaleidoscope there are no edge effects. Light can be extracted at the other edge of the cylinder or along the tube either using some extraction feature or tapering the cylinder wall towards the end.

Figure 25:
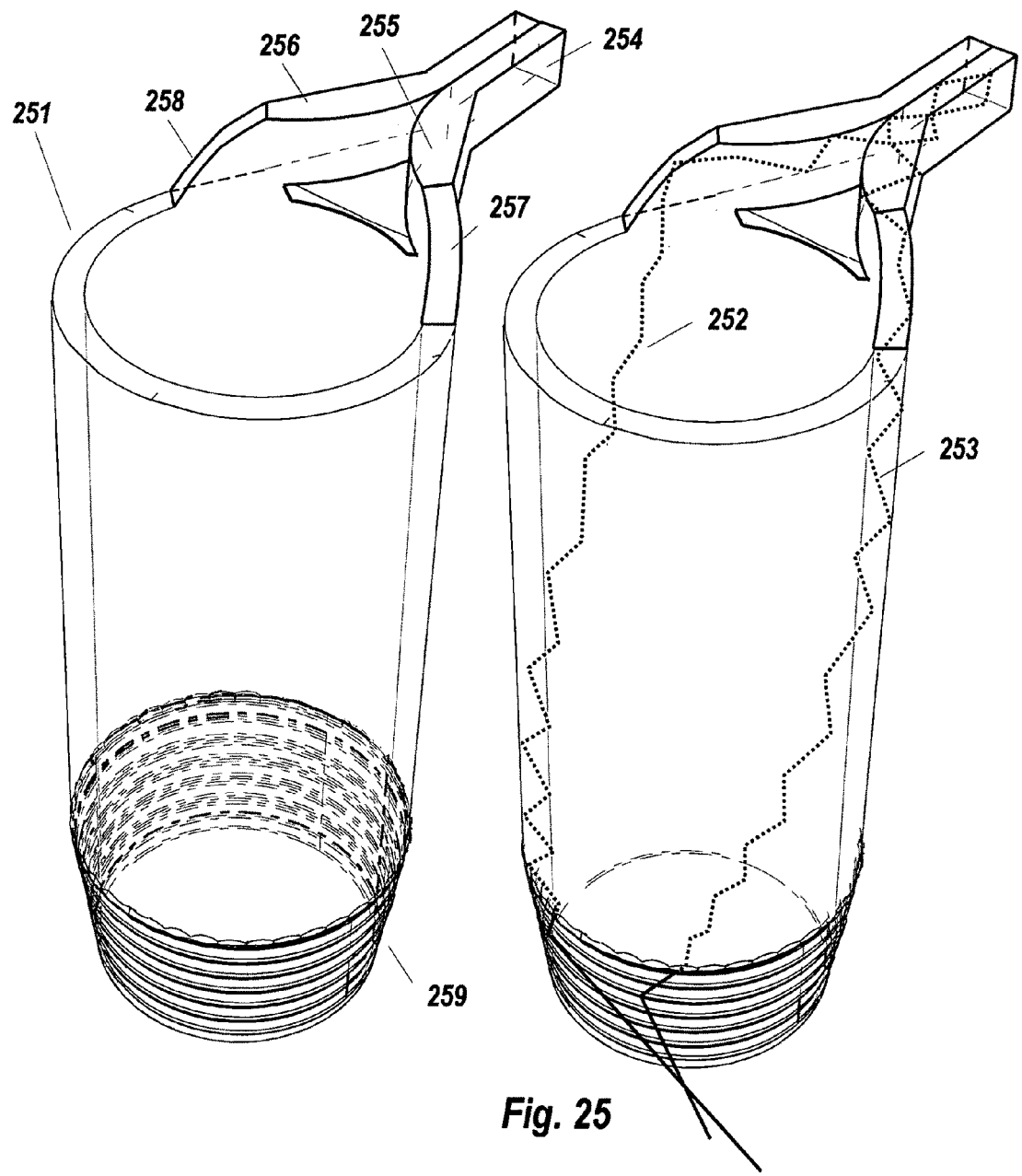
FIG. 25 shows a cylindrical geodesic waveguide with an injector and an extractor.

FIG. 25 left shows the same cylindrical waveguide 251 as part of a more complex system. The piece in this figure is made of a dielectric transparent material. An input beam, here represented by rays 252 and 253 (FIG. 25 right) is injected at plane 254. The beam is split into two by means of arm-pipes 255 and 256, which end in the form of tilted mirrors 257 and 258 that bounce the light towards the interior of tube. Light travels along the tube and is mixed by it getting more uniform illumination at the other edge of the cylinder. Extraction can be held at the bottom end or elsewhere if the guide tapers towards the end or some extraction feature 259 is added. Rays with high skew invariant can only be extracted with non-rotational symmetric features. The skew invariant (or skweness) of a ray can be calculated at any point of its trajectory as the product of the refractive index of the point times the distance from the point to the axis times the cosine of the angle formed by the ray and a circle perpendicular to the axis and centered in it. Unlike the plane waveguide, the cylinder advantageously lacks of border effects, which prevent from losses and facilitates the light mixing. Such tubular lens can guide light to inaccessible areas that need to be illuminated uniformly, like in some medical practices (surgery). The same device can act limiting and protecting the area where surgery is to be applied, and enables the inside room for accessing such area with other surgical instruments that however would not block lighting as long as light extraction is carried out at the end of the tube.

Figure 26:
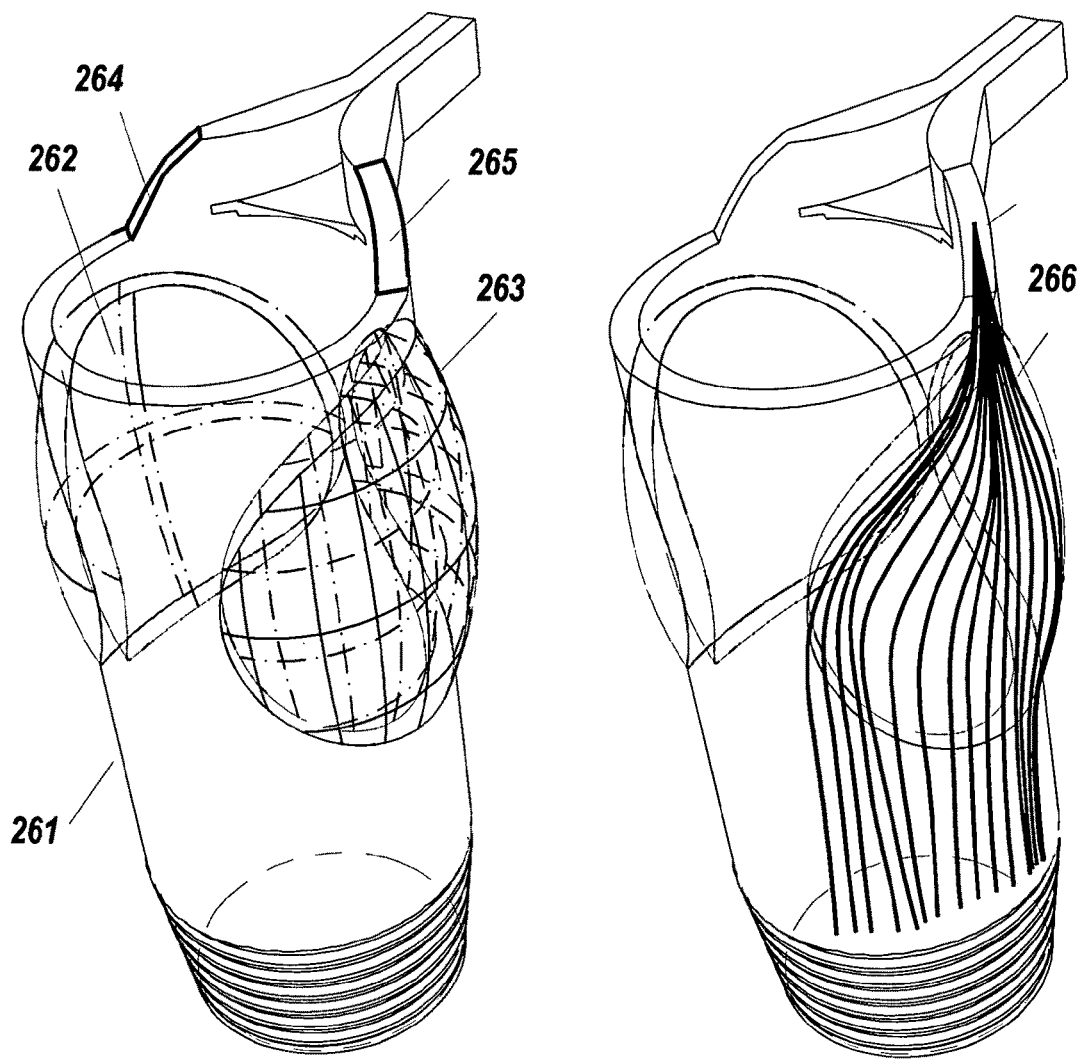
FIG. 26 shows a cylindrical geodesic waveguide incorporating geodesic lenses.

Rinehart and other geodesic lenses can be integrated in a cylindrical surface by mapping the plane of the geodesic lens base into the surface of the cylinder. The geodesic lens can be mapped so its radial projection on the cylinder surface maps in the planar projection on the corresponding plane. For example, FIG. 26 shows on the left the same tubular lens 261 as in FIG. 25 interrupted by two geodesic lenses 262 and 263 immediately below the light injection points 264 and 265. These geodesic lenses form two protuberances which can be outwards (as in the case of FIG. 26) or inwards the tube. The trajectories of some rays can be seen in FIG. 26 right, showing that such protuberances collimate ray pencils 266 towards the cylinder base, where extraction can be carried out more efficiently independently on the strategy utilized (the skewness of rays diminishes on average due to the collimating effect of the geodesic lens).

REFERENCES

The following documents are incorporated herein by reference in their entirety.

U.S. Patent Documents

U.S. Pat. No. 3,917,384 by Harper, Lean, Spiller, & Wilczynski, "High Resolution Lenses for Optical Waveguides", 1975

U.S. Pat. No. 4,345,815 by Righini, Sottini, & Russo, "Perfect Geodesic Lenses", 1982

U.S. Pat. No. 4,610,502 by Nicia & Khoe, "Method of Manufacturing a Geodesic Component", 1986

U.S. Pat. No. 4,611,883 by Myer, "Two-Dimensional Optics Element" 1986

U.S. Pat. No. 4,712,856 by Nicia, "Geodesic Optical Component", 1987

Other Publications

R. K. Luneburg, Mathematical Theory of Optics, Univ. Cal. Press, Berkeley 1964 (p. 187)

G. C. Righini, V. Russo, S. Sottini, and G. Toraldo di Francia, "Geodesic lenses for guided optical windows," Appl. Opt. 12, 1477-(1973)

V. E. Wood, "Effects of edge-rounding on geodesic lenses," Appl. Opt. 15, 2817-(1976)

Sottini, Russo, & Righini, 1979, "General solution of the problem of perfect geodesic lenses for integrated optics", J. Opt. Soc. Am., Vol. 69, pp 1248-1254

Sottini, Russo, & Righini, 1980, "Geodesic optics: new components", J. Opt. Soc. Am., Vol. 70, pp 1230-1234

Sochacki & Gomez-Reino, 1985, "Nonfull-aperture Luneburg lenses", App. Opt, Vol. 24, pp 1371-1373

Sochacki, 1986, "Perfect geodesic lens designing", App Opt, Vol. 25 pp 235-243

Sottini & Giorgetti, 1987, "Theoretical analysis of a new family of geodesic lenses", J. Opt. Soc. Am. A, Vol. 4, pp 346-351

(By the present inventors) J. C. Miñano et al, "Geodesic Lenses Applied to Non-Imaging Optics", SPIE 6338-07, Aug. 13, 2006

The invention claimed is:

1. An optical integrator comprising first and second kaleidoscope portions connected by at least one geodesic lens.

2. An optical integrator according to claim 1, wherein the first and second kaleidoscope portions and the geodesic lens are formed from a generally two-dimensional waveguide.

3. An optical integrator according to claim 2, wherein the geodesic lens is formed by a part of the waveguide projecting in the third dimension.

4. An optical integrator according to claim 2, wherein the two-dimensional waveguide is generally flat.

5. An optical integrator according to claim 2, wherein the two-dimensional waveguide comprises a tube, and is provided with a source of light towards one end of the tube from the geodesic lens and an outlet for light towards the other end of the tube from the geodesic lens.

6. An optical integrator according to claim 5, where the light from the source is split into beams by arm pipes that distribute and inject the light along the tube edge.

7. An optical integrator according to claim 5, wherein the at least one geodesic lens comprises Rinehart lenses below the light injection points to collimate the beams and facilitate light extraction.

8. An optical integrator according to claim 1, comprising an array of LEDs positioned to supply light to the integrator.

9. An optical integrator according to claim 8, wherein the LEDs are of different colors, and the integrator blends the different colors of light from the LEDs.

* * * * *